Dec. 26, 1961  E. B. NOLT  3,014,335
TINE MOUNTING
Filed Oct. 22, 1959  2 Sheets-Sheet 1

INVENTOR.
EDWIN B. NOLT
BY
ATTORNEY

Dec. 26, 1961 E. B. NOLT 3,014,335
TINE MOUNTING
Filed Oct. 22, 1959 2 Sheets-Sheet 2
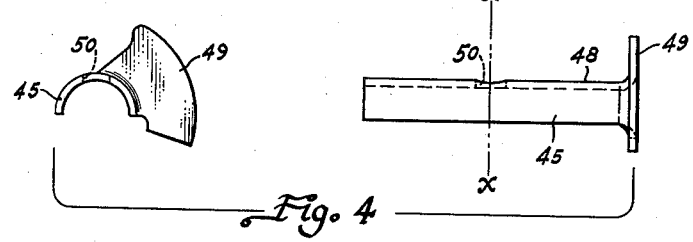
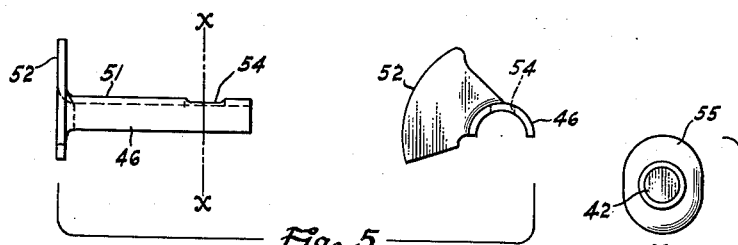
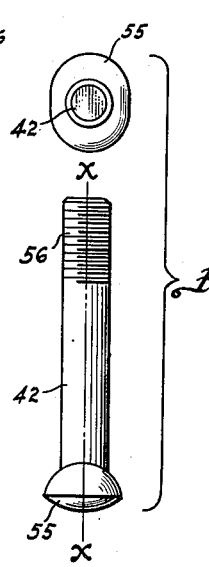
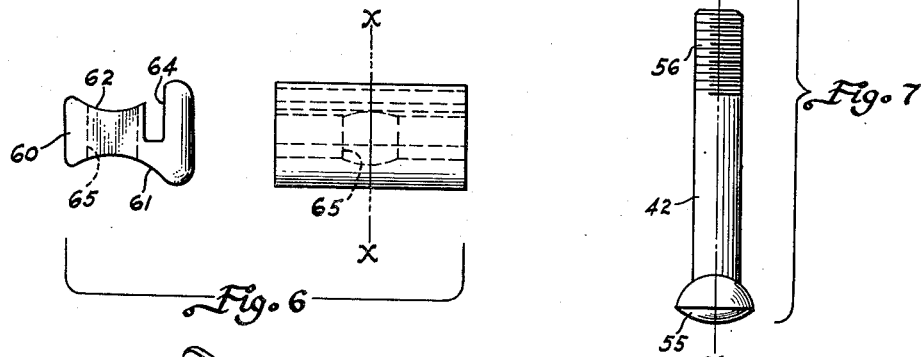
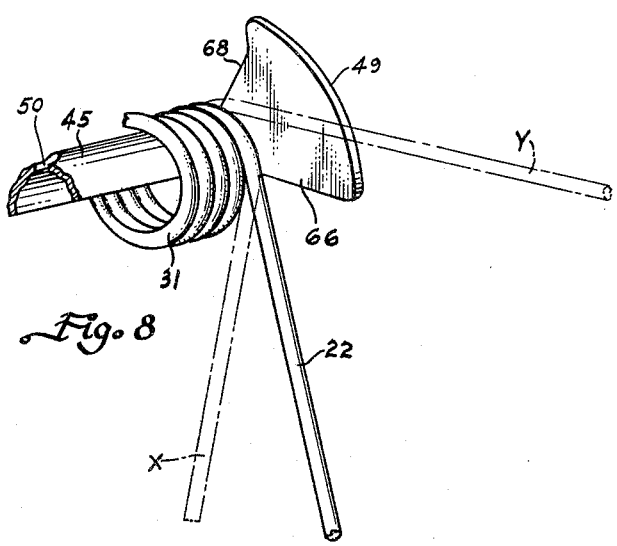
INVENTOR.
EDWIN B. NOLT
BY
Joseph Allen Brown
ATTORNEY

United States Patent Office 3,014,335
Patented Dec. 26, 1961

3,014,335
TINE MOUNTING
Edwin B. Nolt, New Holland, Pa., assignor to Sperry Rand Corporation, New Holland, Pa., a corporation of Delaware
Filed Oct. 22, 1959, Ser. No. 848,152
7 Claims. (Cl. 56—400)

This invention relates to a structure for mounting a spring tine on the rotatable pick-up of an agricultural implement such as a baler.

The pick-up of a hay baler has a plurality of fore-and-aft extending, laterally spaced, stripper members which surround a pick-up reel. The fingers of spring tines on the reel are adapted to project outwardly of the stripper members through the spaces between them. Conventionally, the fingers project about five or six inches as they sweep over the ground and then upwardly and rearwardly. Generally, such projection is fully adequate to prevent the tine fingers from becoming fouled in the stripper members. However, occasionally, a particular tine finger may engage an immovable ground obstacle and be swung rearwardly a substantial amount before the obstacle has been passed and the finger released. Once the finger is free, it will be snapped back toward normal position by the action of the coil spring at the inner end of the finger. In some instances, the spring back is great enough to whip the finger to a position momentarily inside the adjacent stripper members. If the spring back is also accompanied by lateral deflection of the particular finger, such finger may become lodged behind the inside face of an adjacent stripper member thereby fouling the pick-up and damaging the structure on continued rotation of the pick-up reel.

One object of this invention is to provide a device for mounting a spring tine on a reel bar, such mounting having means thereon to guide the tine finger if it is pivoted responsive to the engagement with an obstacle to thereby prevent it from becoming lodged behind cooperative stripper members.

Another object of this invention is to provide tine mounting means having means thereon for dampening a swinging action of an associated spring tine.

A further object of this invention is to provide spring tine mounting means which is adjustable whereby the mounting structure may be properly oriented relative to the spring tine which it is to support for optimum operating characteristics.

Other objects of this invention will be apparent hereinafter from the specification and from the recital in the appended claims.

In the drawings:

FIGS. 4–7 are detail end and side views of the component parts of the mounting structure; and FIG. 8 is a fragmentary perspective view showing one end portion of the mounting structure and the relation of the adjacent spring finger relative thereto.

Figure 1:
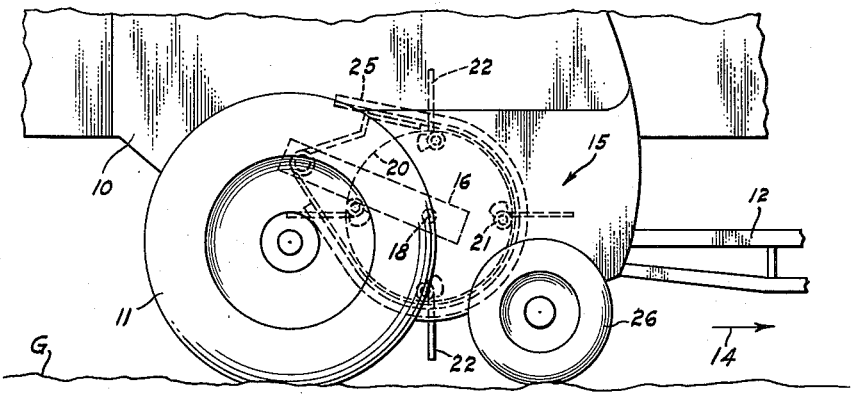
FIG. 1 is a fragmentary side view of the pick-up portion of a hay baler, the tines of the pick-up being mounted according to this invention.

Referring now to the drawings by numerals of reference and first to FIG. 1, 10 denotes generally a hay baler which is supported on the ground G by wheels 11. The baler has a drawbar 12 adapted to be connected to the tractor or other vehicle used for towing the baler. Extending transversely relative to the direction of travel of the baler is indicated by the arrow 14, is a pick-up 15. The pick-up is supported on downwardly and forwardly extending support arms 16 in which the drive shaft 18 of a reel 20 is journalled.

Reel 20 has four angularly spaced transversely extending reel bars 21 which support rake fingers 22. The rake fingers 22 extend radially from the reel and project through the spaces 24 between fore-and-aft extending laterally spaced stripper members 25. When viewed as shown in FIG. 1, the pick-up 15 rotates in a counter-clockwise direction. Crop material on the ground G is engaged by the fingers as they sweep forwardly, then upwardly, and then rearwardly. The crop material slides over stripper members 25 and is deposited on a rearwardly positioned feed platform, not shown, where it is conveyed into the baler through a suitable feed mechanism. The pick-up has a ground wheel 26 which causes the pick-up to move up and down responsive to variations in ground conditions.

Figures 2, 3:
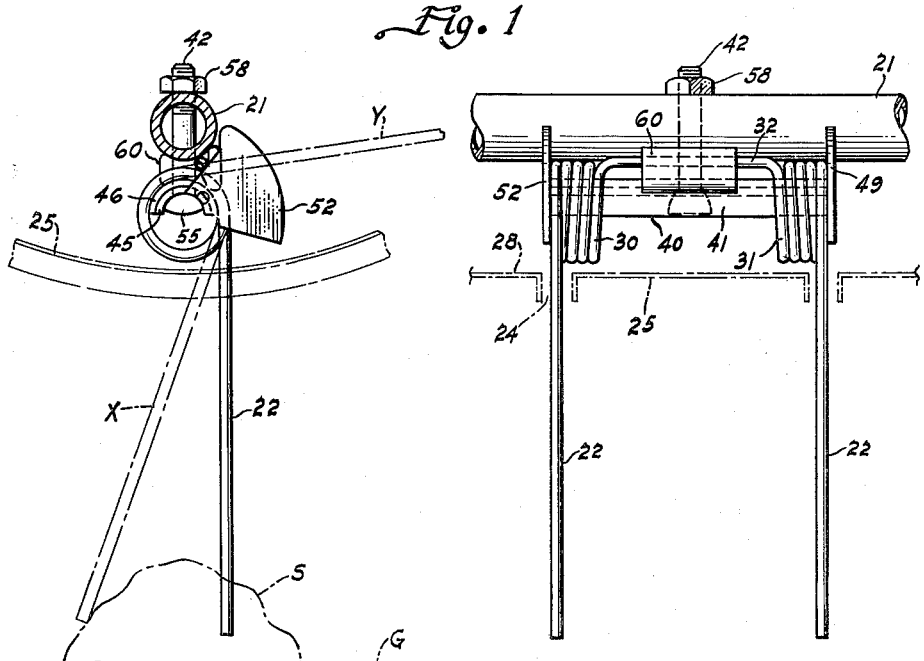
FIG. 2 is a transverse section through a reel bar of the pick-up illustrating the tine mounting means of this invention and the relative relationship of the spring tine to the stripper members of the pick-up. The tine fingers are shown in normal position in solid lines and in sprung positions in dotted lines.
FIG. 3 is a front view of FIG. 2.

If a given pick-up finger engages a stone S as shown in FIG. 2, the finger will be sprung rearwardly to the dotted line position X in response to both the forward movement of the machine and the rotation of the pick-up reel. Once the stone has been passed over, the finger will be snapped back to normal position and in some instances the spring back may be great enough that the finger will assume the dotted line position Y shown in FIG. 2 before it drops back toward normal position. When in the position shown at Y, the spring finger is within the cylinder or drum provided by the stripper members. If when a spring finger swings it is also laterally deflected, the finger may become lodged on top of an adjacent stripper member and against an inside face 28 (FIG. 3) of such member. This will both foul and damage the pick-up.

To mount the spring tines on the reel bars 21 and to protect against the fingers becoming lodged behind the stripper members a mounting device has been provided which will now be described.

The spring fingers 22 are mounted in pairs. Each spring tine comprises a pair of coils 30 and 31 which are positioned on a common axis and such axis is parallel to the axis of the reel bar 21 on which they are mounted. The coils are interconnected by a loop portion 32 as shown best in FIG. 3. The loop portion 32 extends between the inner axial ends of the tine coils. The rake fingers 22 extend tangentially from the coils at the outer axial ends of the coils. Extending through coils 30 and 31 is a support 40 having a central portion 41 between the coils which is connected to the reel bar 21 by a bolt 42.

Support 40 comprises two semi-cylindrical portions, namely a righthand portion 45 (FIG. 4) and a lefthand portion 46 (FIG. 5) which when positioned together overlap to form the middle section 41 of the support. The member 45 has a portion 48 on which the coil 31 is adapted to seat. Extending radially therefrom is a flange portion 49 which constitutes both a guide and a dampening member as will be subsequently described. Member 45 has a bolt hole 50 which is circular and of such diameter that the bolt snugly passes therethrough. The member 46 has a portion 51 around which coil 30 extends. It also has a radially projecting flange 52 which is identical in size and configuration with the flange 49 on the member 45. Member 46 has a hole 54 which is elongate in a longitudinal direction relative to the support. Members 45 and 46 are adapted to be mounted with member 45 on top of member 46 with the holes 50 and 54 in register.

In assembling the mounting, the member 45 will be slipped through coil 31 and the member 46 through coil 30 and under member 45. With the members so disposed the bolt 42 is passed up through the holes 50—54 through the pipe 21 to thereby connect the tine to the shaft. The bolt 42 has a rounded head 55 (FIG. 7) which fits into the hole 54 in member 52. It has a threaded end 56 adapted to receive the fastening bolt 58 to thereby clamp the mounting to the reel bar 21.

Interposed between support 40 and bar 21 is a spacer member 60 (FIGS. 2, 3 and 6) having a curved bottom surface 61 which seats on top of the member 45 and a curved upper surface 62 which is engageable with the periphery of reel bar 21. The spacer member has a slot 64 which receives the loop 32 of the spring tine thereby connecting the spring tine to the mounting structure and preventing the coils from rotating relative thereto when the structure is connected to the reel bar. The spacer member also has a hole 65 to receive the bolt 42.

Referring to FIG. 8, the relationship of a tine finger with its associated guide and dampening member is shown. As illustrated, the member 49 extends radially a substantial distance beyond the periphery of the coil 31 and generally perpendicular to the axis of reel bar 21 (FIG. 3). As shown in FIG. 2, member 49 extends in such a direction that it does not engage or interfere with reel bar 21. The radial projection of the member 49 is greater than the radius of the coil. The member 49 has a leading edge 66 and a trailing angularly spaced edge 68. The leading edge 66 is adjacent the tangent point of finger 22 and coil 31.

In assembling the structure, the members 45 and 46 are axially adjusted toward each other until the flange members 49 and 52 abut firmly against the adjacent axial ends of the tine coils and engage the inner ends of the tangentially extending fingers 22. This adjustment is made possible by the elongate slot 54 in member 46. With the support so disposed and connected to reel 21, when an obstacle is encountered by a given finger, it is free to swing rearwardly to the position shown at X in FIGS. 2 and 8. When the obstacle has been passed, the energy which is stored up in the spring 31 causes the finger to snap back toward normal position. If the energy is great enough, it may swing the finger all the way up to the position shown at Y. As the finger moves from the position X up to the position Y, it slides against the inner face of the adjacent flange member and such engagement produces two results. First, the swinging action of the finger is dampened by its frictional engagement with the flange. Secondly, any tendency of the finger to deflect laterally is resisted and even if the finger is able to swing far enough to become disposed within the confines of the stripper members, it will drop back through the space 24 between adjacent stripper members and not become lodged on a surface 28 of one of such members. Lateral deflection of the finger as it swings is thereby prevented. As a result, fouling of the pick-up mechanism is protected against.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A device for connecting a spring tine to a reel bar or the like, wherein the tine has a pair of spaced coils connected by a loop, said coils being disposed on a common axis and said axis being generally parallel to the axis of the reel bar, and a finger extending in a normal position tangentially from the axial end of each coil remote from said loop and outwardly of said bar, said device comprising an elongate support extending through both of said coils, a member extending radially from each end of said support substantially beyond the periphery of the adjacent coil in a plane transverse and generally perpendicular to said axis, said support having means for varying the length of the support whereby the member at each end can be set to bear against the adjacent finger to resist lateral deflection of the finger when the finger is swung in a plane perpendicular to said axis and to dampen the swing, and means connecting said support to said reel bar.

2. A device for connecting a spring tine to a reel bar or the like, wherein the tine has a pair of spaced coils connected by a loop, said coils being disposed on a common axis and said axis being generally parallel to the axis of the reel bar, and a finger extending in a normal position tangentially from the axial end of each coil remote from said loop and outwardly of said bar, said device comprising a support extending through both of said coils, a member extending radially from each end of said support substantially beyond the periphery of the adjacent coil in a plane transverse and generally perpendicular to said axis, said support having two overlapping sections between said coils and slidably adjustable relative to each other in a direction parallel to said axis whereby the member at each end of the support can be set to bear against the adjacent finger to resist lateral deflection of the finger when the finger is swung in a plane perpendicular to said axis and to dampen the swing, and means connecting said overlapping sections to said reel bar.

3. A device as recited in claim 2 wherein said overlapping sections of said support have registering holes one of which is elongate in the direction of extent of the support, and said fastening means comprising a bolt having a shank extending through said holes and connected to said reel bar.

4. A device as recited in claim 2 wherein a spacer element is interposed between the middle portion of said support and said reel bar, and means connecting said element and said loop to lock said coils against pivotal movement on said support.

5. A device as recited in claim 2 wherein each member has a first radial edge extending outwardly from adjacent the point where the end of the associated finger joins the associated coil and a second angularly spaced radial edge disposed adjacent said reel bar.

6. A device as recited in claim 2 wherein said members project from said coils a distance greater than the radii of the coils.

7. A device as recited in claim 3 wherein said bolt has an elongate head which fits into said elongate hole and holds the bolt shank from rotating relative to said reel bar.

References Cited in the file of this patent

UNITED STATES PATENTS

| | | |
|---|---|---|
| 324,000 | Bentel | Aug. 11, 1885 |
| 2,521,492 | Snyck et al. | Sept. 5, 1950 |
| 2,657,521 | Happe | Nov. 3, 1953 |
| 2,764,163 | Thys | Sept. 25, 1956 |
| 2,856,748 | Keene | Oct. 21, 1958 |

FOREIGN PATENTS

| | | |
|---|---|---|
| 585,026 | France | Dec. 1, 1924 |